Oct. 13, 1964   R. H. MURRAY ETAL   3,152,652
JET PIERCER BLOW PIPE AND TOOTH LUG THEREFOR
Filed May 21, 1962
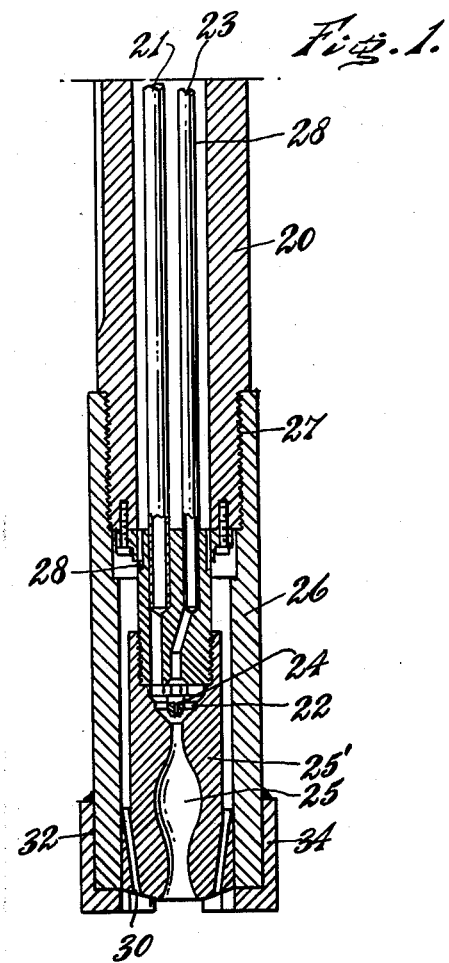
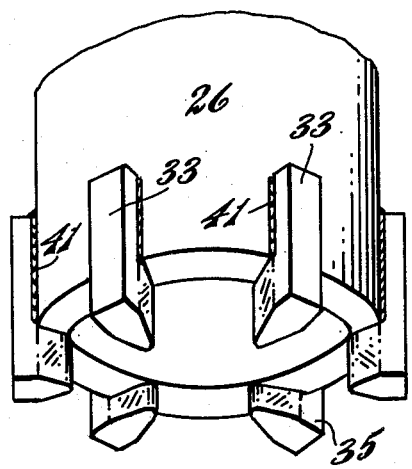
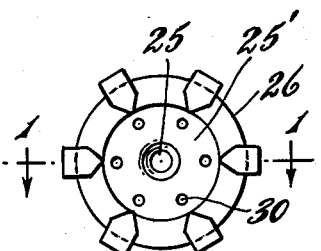
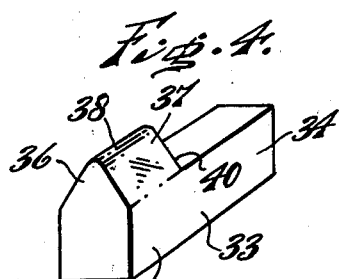
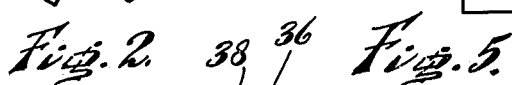
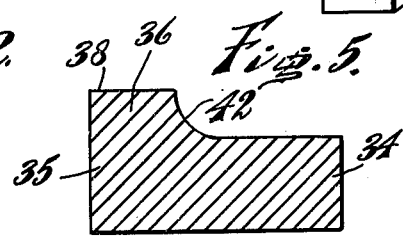
INVENTORS
Richard H. Murray
Wayne L. Wilcox
BY
ATTORNEYS United States Patent Office 3,152,652
Patented Oct. 13, 1964

3,152,652
JET PIERCER BLOW PIPE AND
TOOTH LUG THEREFOR
Richard H. Murray, St. Paul, Minn., and Wayne L. Wilcox, Havertown, Pa., assignors to Arcos Corporation, Philadelphia, Pa., a corporation of Pennsylvania
Filed May 21, 1962, Ser. No. 196,353
7 Claims. (Cl. 175—15)

The present invention relates to an improved construction for a rotating reamer head or scraper of a rock cutting blow pipe or drill, and to improved lugs for forming reamer head teeth.

A purpose of the invention is to produce a reamer head which will have longer service life and less down time.

A further purpose is to produce a less brittle and less fragile reamer tooth for a rock cutting drill.

A further purpose is to reduce the cost per foot of drilling by a rock cutting drill reamer head.

A further purpose is to reduce the amount of post welding finishing required on a rotating reamer head for a rock drill.

A further purpose is to employ a more abrasion resistant, more temperature resistant and more corrosion resistant alloy which will give a higher service life in a rock cutting reamer head.

A further purpose is to provide a rock cutting drill reamer head tooth that is more resistant to impact.

A further purpose is to quickly apply a tooth lug to a rock cutting reamer head by welding a precast weld tooth lug on bodily to a tube.

A further purpose is to make the tooth of a rock cutting reamer of a uniform composition throughout which will more effectively stand up under service conditions.

Further purposes appear in the specification and in the claims.

In the drawings we have chosen to illustrate a few only of the numerous embodiments in which the invention may appear, selecting the forms shown from the standpoints of convenience in illustration, satisfactory operation and clear demonstration of the principles involved.

FIGURE 1 is a diagrammatic central vertical section of the lower portion of a rock drill using a reamer head and reamer head teeth according to the present invention. The section is taken on the line 1—1 of FIGURE 2.

FIGURE 2 is a bottom plan view of the rock drill shown in FIGURE 1.

FIGURE 3 is a perspective of the lower portion of a reamer head according to the invention.

FIGURE 4 is a perspective of one form of tooth lug employed in the invention.

FIGURE 5 is a central section of an alternate form of tooth lug according to the invention.

Describing in illustration but not in limitation and referring to the drawings:

Extensive use is made in mining and quarrying operations of blow pipes which are used particularly to drill blast holes in various ores and rocks, typical illustrations being taconite iron ore or jasper, quartzite, traprock, granite, dolomite or the like.

The blow pipe of the invention in general may be similar to any one of a wide variety of prior art blow pipes, suitable examples being Wyland U.S. Patent No. 2,628,817, granted February 17, 1953, for Rock Piercing Blow Pipe; Craig U.S. Patent No. 2,327,598, granted August 14, 1943, for Blow Torch; Royer U.S. Patent No. 2,679,281, granted May 24, 1954, for Thermal Rock Piercing Apparatus and Automatic Control; and Royer U.S. Patent No. 2,935,303, granted May 3, 1960, for Thermal Rock Piercing Control Apparatus.

In common practice in the prior art, a rock shattering flame is produced, as for example by introducing oxygen and a fuel such as kerosene or acetylene into the blow pipe. This flame is projected downwardly in the usual rock drill. Also, in many cases, water is introduced which has the effect of cooling the metal parts, and also quenching the heated rock, so that a fragmentation or shattering process takes place.

The drill in usual practice has a rotating reamer head which surrounds the opening through which the flame is issuing, and which is provided with so-called teeth which perform several functions. By protuding beyond the forward end of the central portion of the blow pipe, the teeth prevent direct contact between the forward end of the flame issuing opening of the combustion chamber and the rock, and therefore prevent flame-out which would otherwise be likely to occur. Also, there would be danger in this case of destroying the burner head by melting. Furthermore, the teeth tend to break up or crush fragments which have been removed from the body of the rock, maintain a concentric blast hole of uniform size, and tend to eject fragments of ditritus which issue from the blast hole. Reamer heads in common practice have an outside diameter of about 6½ inches.

The teeth are subjected to forces which tend to deteriorate them and which appear to be a combination of high temperature, abrasion, impact, and corrosion. Therefore, unless precautions are taken to make the teeth unusually resistant to these destructive forces, the teeth rapidly wear away and would not last for more than a few feet or a few inches of drilling. Prior practice has been to overlay the teeth by weld surfacing with an alloy which has usually been Stellite 6 having a composition generally as follows:

Carbon _____ 1%.
Manganese _____ 1% maximum.
Cobalt _____ Remainder.
Tungsten _____ 3 to 6%.
Nickel _____ 3% maximum.
Chromium _____ 26 to 32%.
Molybdenum _____ 1% maximum.
Iron _____ 3% maximum.
Silicon _____ 0.4 to 2%.

This overlay layer tended to increase the life of the reamer teeth, but still failure occurred after drilling from a few feet to a maximum of possibly 100 odd feet. It is then necessary to detect incipient failure and remove the reamer head for repair by subsequent surface welding, and if the danger of failure is not found in time, then it is likely that the reamer head and the burner head will be destroyed. The burner head is, of course, a relatively very expensive component.

Efforts were made experimentally to make castings of Stellite 6 and utilize them as reamer teeth, but these failed after drilling only a few feet.

An extensive experimental program has been carried out in an effort to develop an improved reamer tooth, and to evaluate its service performance.

As a result of this activity, a new reamer tooth has been developed, which in typical instances has increased the service life by from 40 to 50% over the best prior practice.

It also offers many advantages in addition to increased footage.

The reamer tooth according to the invention is made from a cast lug of an alloy which is much less subject to deterioration in service. The lug of the invention offers an optimum combination of resistance to abrasion, to high temperature and to corrosion, and ductility. Therefore, it is not likely to form a brittle fracture under impact.

The lug of the invention can be very easily applied without the tedious application of overlay technique since it is of uniform composition. It is merely placed in position and welded directly on to the reamer head using, for example, a standard stainless steel welding rod.

The alloy of the tooth lug is in itself weldable and no special precautions need be taken.

Furthermore, the weld lug of the invention after application need not be sized by any post welding finishing technique. Grinding which is normally incident to surface welding is thus avoided, also gauging and inspection of the post welding finishing are not necessary.

It will thus be evident that the combination of all these advantages greatly reduces the cost per foot of hole drilled.

Considering FIGURES 1 to 4 of the drawings, we there illustrate the lower end of a blow pipe 20 which may conveniently be that shown in FIGURE 1a of the Wyland patent above referred to, with slight modifications according to the present invention.

Oxygen is supplied from a stationary feeding head of well known character (not shown) through pipe 21 within blow pipe 20 and enters a chamber 22 around the burner. A fuel, such as kerosene or the like, is supplied through the stationary head by pipe 23 in blow pipe 20 and is discharged through burner tip 24.

The flame passes through combustion chamber 25 of burner head 25' and is discharged at the lower end to drill the rock.

The entire blow pipe rotates as by a suitable drive not shown, and carries at the lower end a reamer head 26 which is conveniently applied as by threading at 27 on to the lower end of the blow pipe.

In usual practice, water enters the space 28 around the pipes 21 and 23 and within the flow pipe, and passes through discharge ports 30 in the burner head and is ejected at the front or bottom of the burner. The use of water is optional.

In accordance with the invention, the outside of the reamer head 26 near the lower end is provided with a series of teeth 33. These teeth as shown in FIGURE 4, are conveniently referred to as lugs or tooth lugs, and they comprise a substantially rectangular shank 34 and a protruding tooth end 35 which is in prolongation of the rectangular shank 34 and which has a radial inwardly protruding foot 36 which in the form shown is tapered at both sides at 37 and filleted at the radial inner end at 38 and has a shoulder 40 which engages the end of the reamer tube. The taper permits the flame jet to pass radially outwardly without interference with the teeth.

This lug is applied by weld beads 41 which interconnect the lug at appropriate positions around the circumference of the reamer head so that it will be conveniently spaced from the next lug by a distance of several inches, as shown. The length of the foot 36 which spaces the burner head from the rock is in the preferred embodiment about three-quarters of an inch, but it will be understood that this can vary from installation to installation as desired.

The detail of the particular burner construction will, of course, differ in different installations, and it is not intended to limit the invention to a burner of the exact form shown.

The tooth lug in the present form is made from a cobalt base alloy which has the following composition range throughout:

| | |
|---|---|
| Carbon | 0.30 to 0.70. |
| Manganese | 1% maximum. |
| Cobalt | Remainder. |
| Tungsten | 1 to 5%. |
| Nickel | 4% maximum. |
| Chromium | 20 to 30%. |
| Molybdenum | 3 to 6.5%. |
| Iron | 3% maximum. |
| Silicon | 2% maximum. |
| Sulfur | 0.04% maximum. |
| Phosphorus | 0.04% maximum. |

It is believed that the proportions and interrelations of the carbon, the cobalt, the molybdenum, the tungsten and the chromium are responsible for the improved properties of the alloy of the invention.

The preferred composition of the alloy of the invention which is used for best results is as follows:

| | |
|---|---|
| Carbon | 0.40 to 0.55%. |
| Manganese | 0.50%. |
| Cobalt | Remainder. |
| Tungsten | 4%. |
| Nickel | 4% maximum. |
| Chromium | 25%. |
| Molybdenum | 5%. |
| Iron | 3% maximum. |
| Silicon | 0.60%. |
| Sulfur | 0.04% maximum. |
| Phosphorus | 0.04% maximum. |

Intermediate results between the preferred composition and the wider permissible range are obtained by limiting the chromium to the range between 23 and 27%.

In FIGURE 5 we illustrate a modification to the lug of the invention which has the advantage of providing better support for the foot 36 when it begins to wear down and has less notch effect, in which a fillet or slope is provided at 42 between the shank and the foot. This raises the problem of notching the forward end of the reamer head as will be evident when the tooth lug of FIGURE 5 is welded on.

In operation it has been found that the improved reamer head and tooth lug of the invention operates in a manner similar to the previous reamer heads, but gives distinctly longer life, at lower cost, and is less subject to down time and replacement.

Percentages stated are percentages by weight.

In view of our invention and disclosure, variations and modifications to meet individual whim or particular need will doubtless become evident to others skilled in the art to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. A reamer head for a blow pipe rock drill, comprising a tube, and teeth extending longitudinally of the tube on the outside thereof and beyond the end of the tube spaced around the tube, said teeth being welded to the tube, and said teeth comprising an alloy having the following composition:

| | |
|---|---|
| Carbon | 0.30 to 0.70%. |
| Manganese | Up to 1%. |
| Cobalt | Remainder. |
| Tungsten | 1 to 5%. |
| Nickel | 4% maximum. |
| Chromium | 20 to 30%. |
| Molybdenum | 3 to 6.5%. |
| Iron | Up to 3%. |
| Silicon | Up to 2%. |
| Sulfur | Up to 0.04%. |
| Phophorous | Up to 0.04%. |

2. A reamer head of claim 1, having the following composition within the range of claim 1:

| | |
|---|---|
| Carbon | 0.40 to 0.55%. |
| Manganese | 0.50%. |
| Tungsten | 4%. |
| Chromium | 25%. |
| Molybdenum | 5%. |

3. A reamer head tooth lug having a generally rectangular shank and having a foot portion which protrudes from one end of the shank, said lug comprising the following alloy:

| | |
|---|---|
| Carbon | 0.30 to 0.70%. |
| Manganese | Up to 1%. |
| Cobalt | Remainder. |
| Tungsten | 1 to 5%. |
| Nickel | 4% maximum. |
| Chromium | 20 to 30%. |
| Molybdenum | 3 to 6.5% |
| Iron | Up to 3%. |
| Silicon | Up to 2%. |
| Sulfur | Up to 0.04%. |
| Phosphorus | Up to 0.04%. |

4. A lug of claim 3, in which the foot is tapered at the end remote from the shank.

5. A lug of claim 3, in which there is a shoulder between the foot and the shank.

6. A lug of claim 3, in which there is a gradual area of change of section between the foot and the shank, which provides for extra support for the foot.

7. A lug of claim 3, which has the following composition:

| | |
|---|---|
| Carbon | 0.40% to 0.55%. |
| Manganese | 0.50%. |
| Tungsten | 4%. |
| Chromium | 25%. |
| Molybdenum | 5%. |

References Cited in the file of this patent

UNITED STATES PATENTS

| | | |
|---|---|---|
| 1,543,921 | Huff | June 30, 1925 |
| 2,309,371 | Wissler | Jan. 26, 1943 |
| 2,545,195 | Crake | Mar. 13, 1951 |
| 2,628,817 | Wyland | Feb. 17, 1953 |
| 2,694,550 | Aitchison | Nov. 16, 1954 |
| 2,896,914 | Ryan | July 28, 1959 |